Aug. 28, 1962  G. V. SUMNER  3,050,928
CONVERTING CONTINUOUS FILAMENT TO STAPLE FIBER
Filed Aug. 18, 1959  7 Sheets-Sheet 1
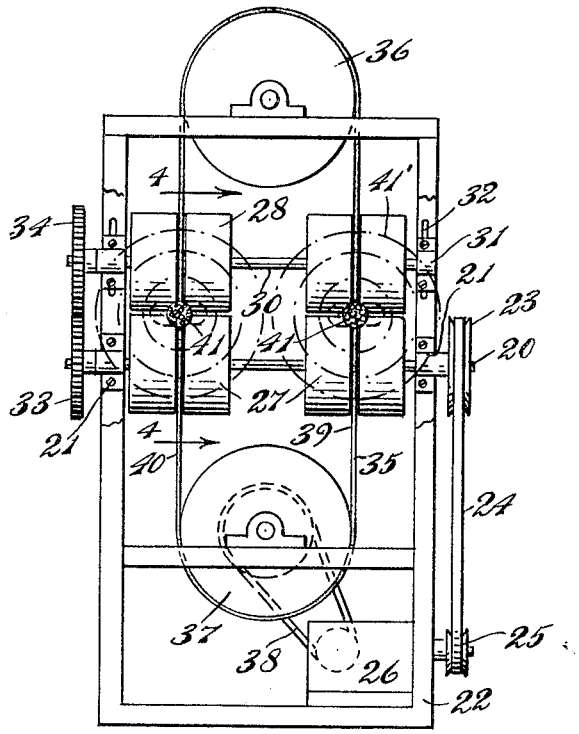
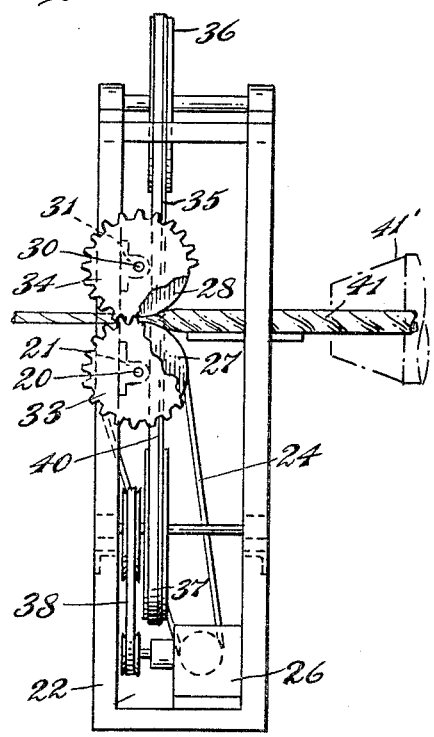
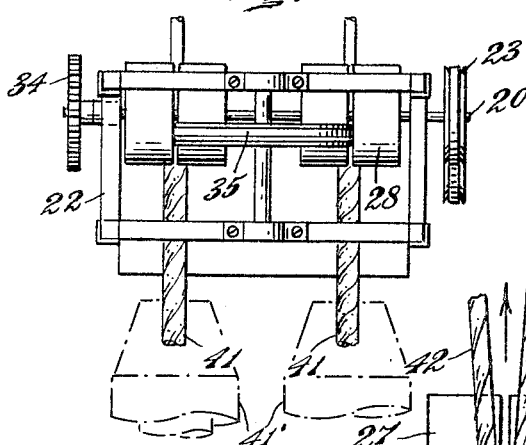
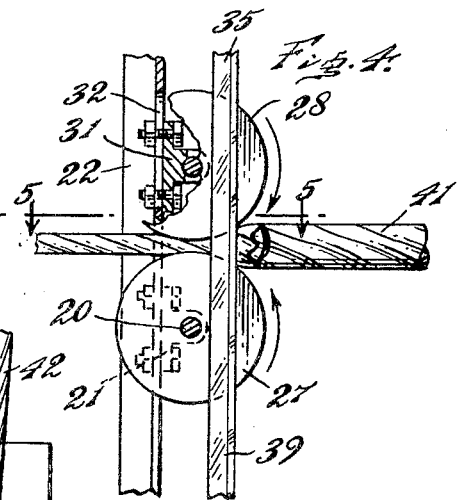
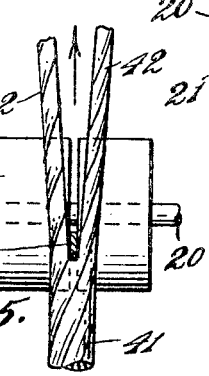
INVENTOR
George V. Sumner
BY
ATTORNEYS Aug. 28, 1962  G. V. SUMNER  3,050,928
CONVERTING CONTINUOUS FILAMENT TO STAPLE FIBER
Filed Aug. 18, 1959  7 Sheets-Sheet 2
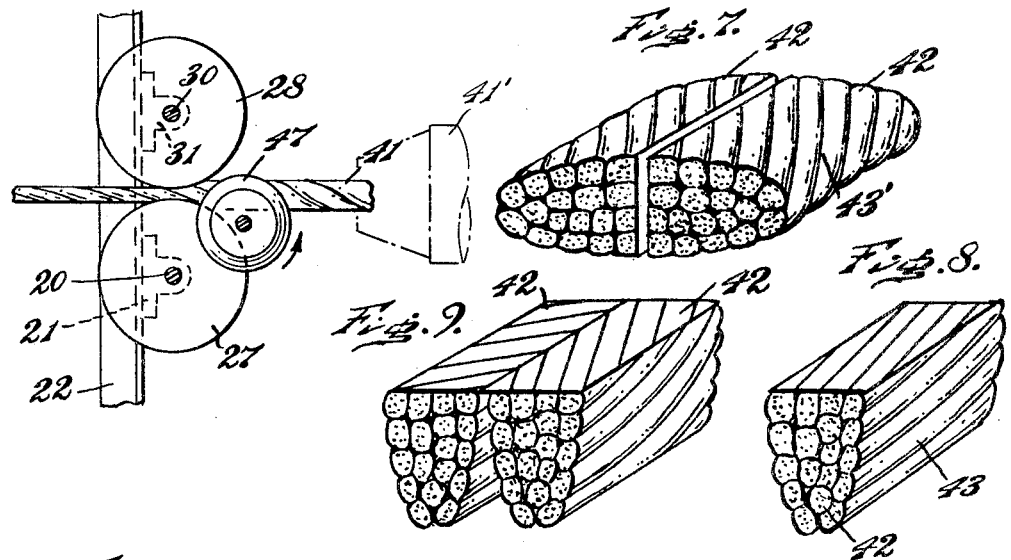
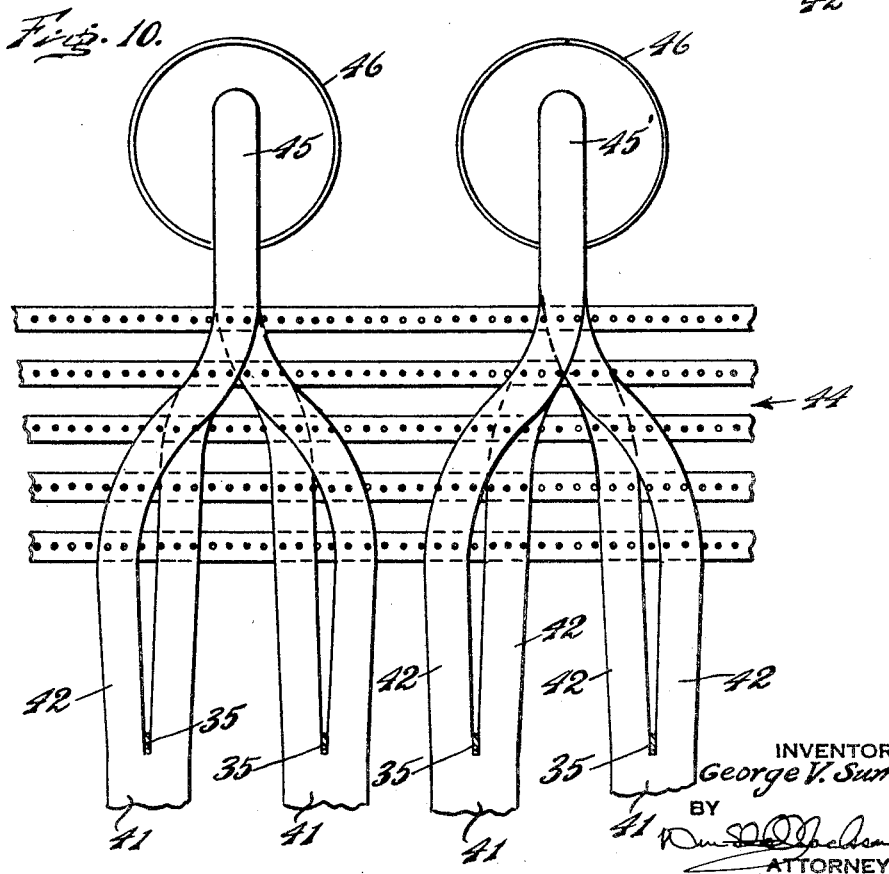
INVENTOR
George V. Sumner
BY
ATTORNEYS.

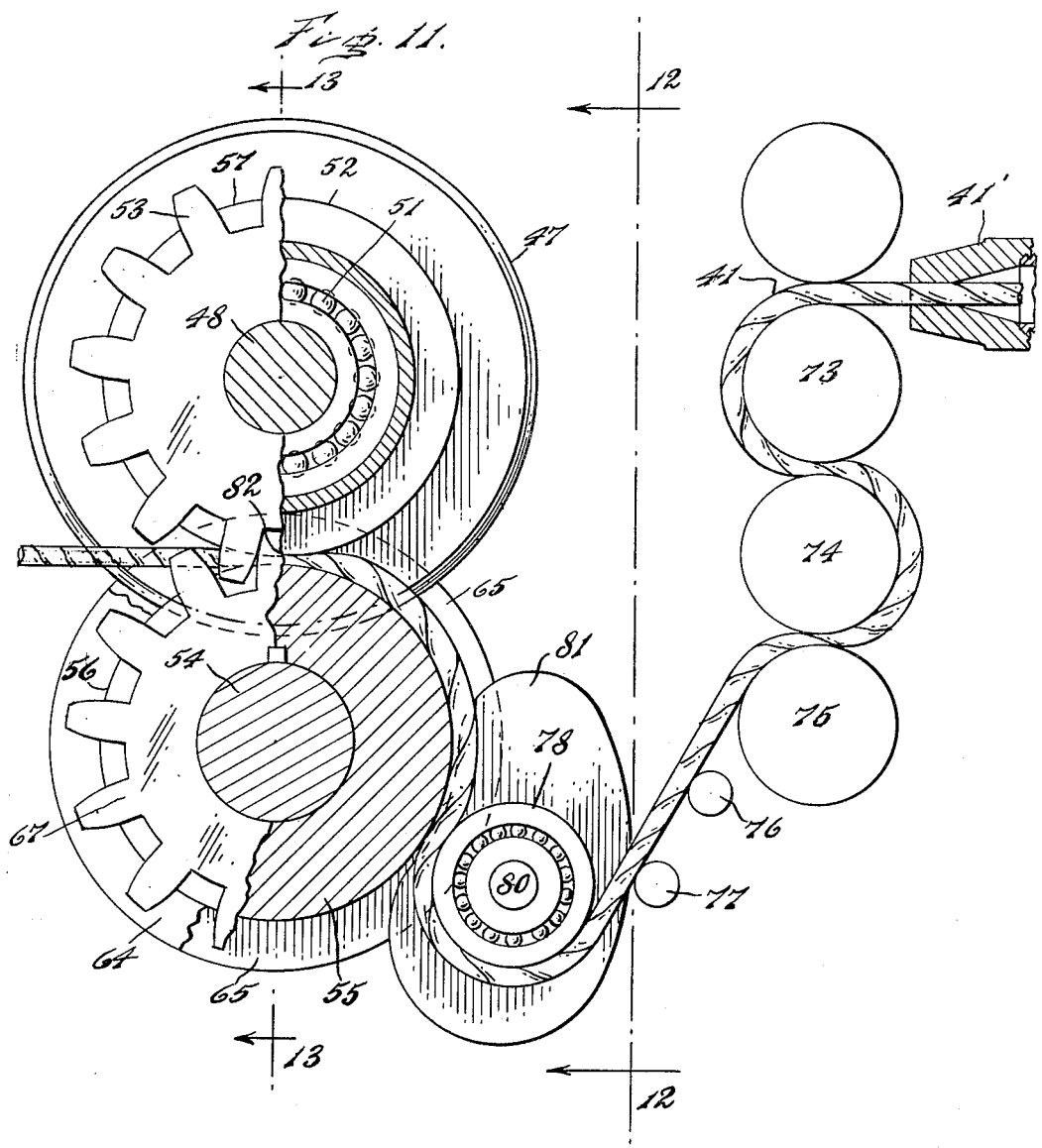

Aug. 28, 1962 G. V. SUMNER 3,050,928
CONVERTING CONTINUOUS FILAMENT TO STAPLE FIBER
Filed Aug. 18, 1959 7 Sheets-Sheet 4
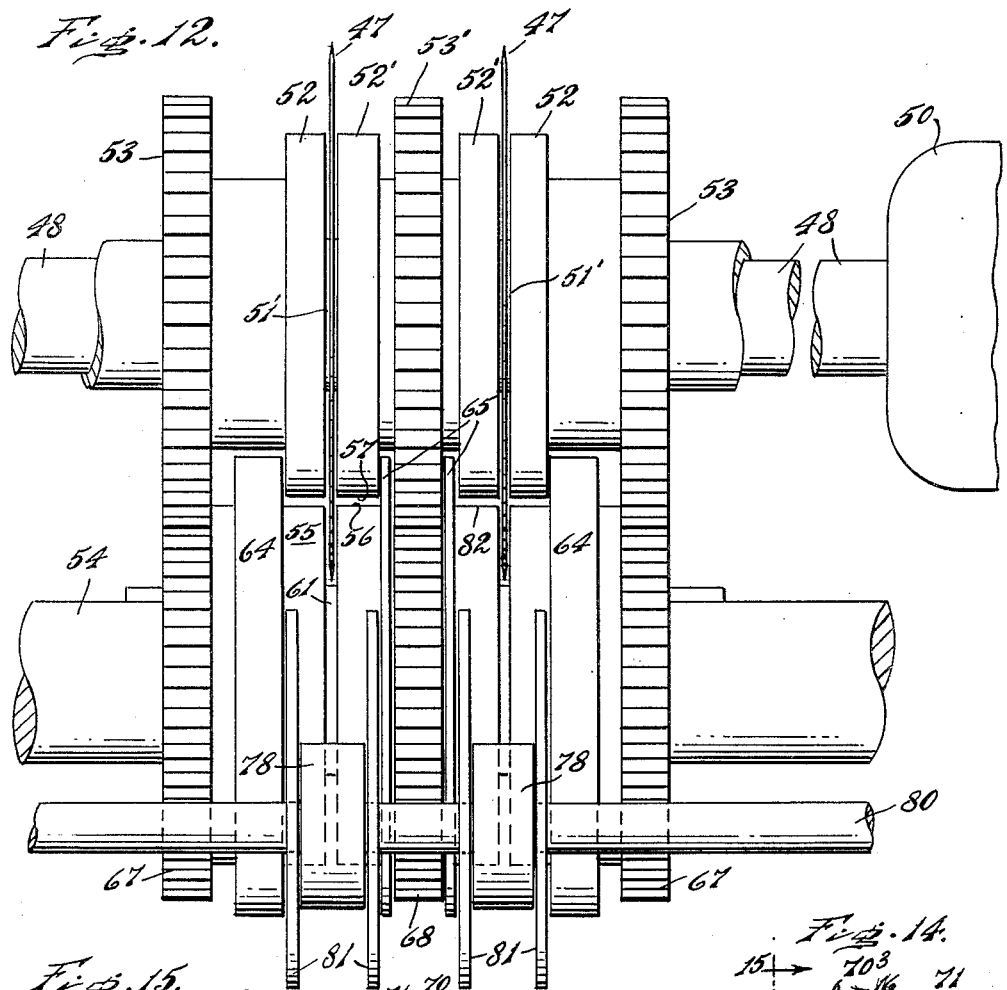
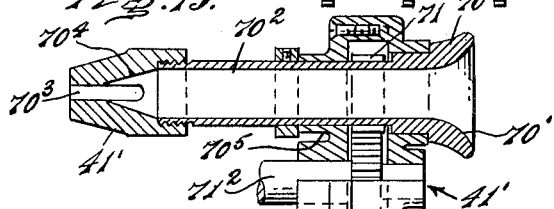
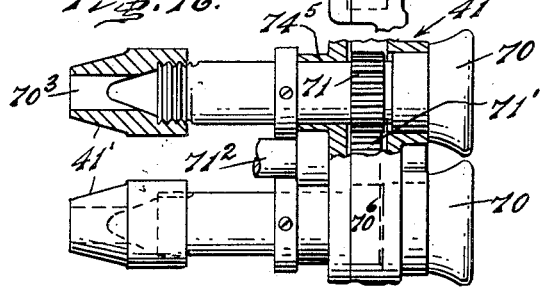
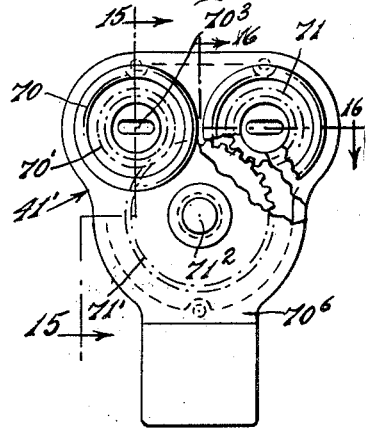
INVENTOR
George V. Sumner
BY
ATTORNEYS Aug. 28, 1962  G. V. SUMNER  3,050,928
CONVERTING CONTINUOUS FILAMENT TO STAPLE FIBER
Filed Aug. 18, 1959  7 Sheets-Sheet 5
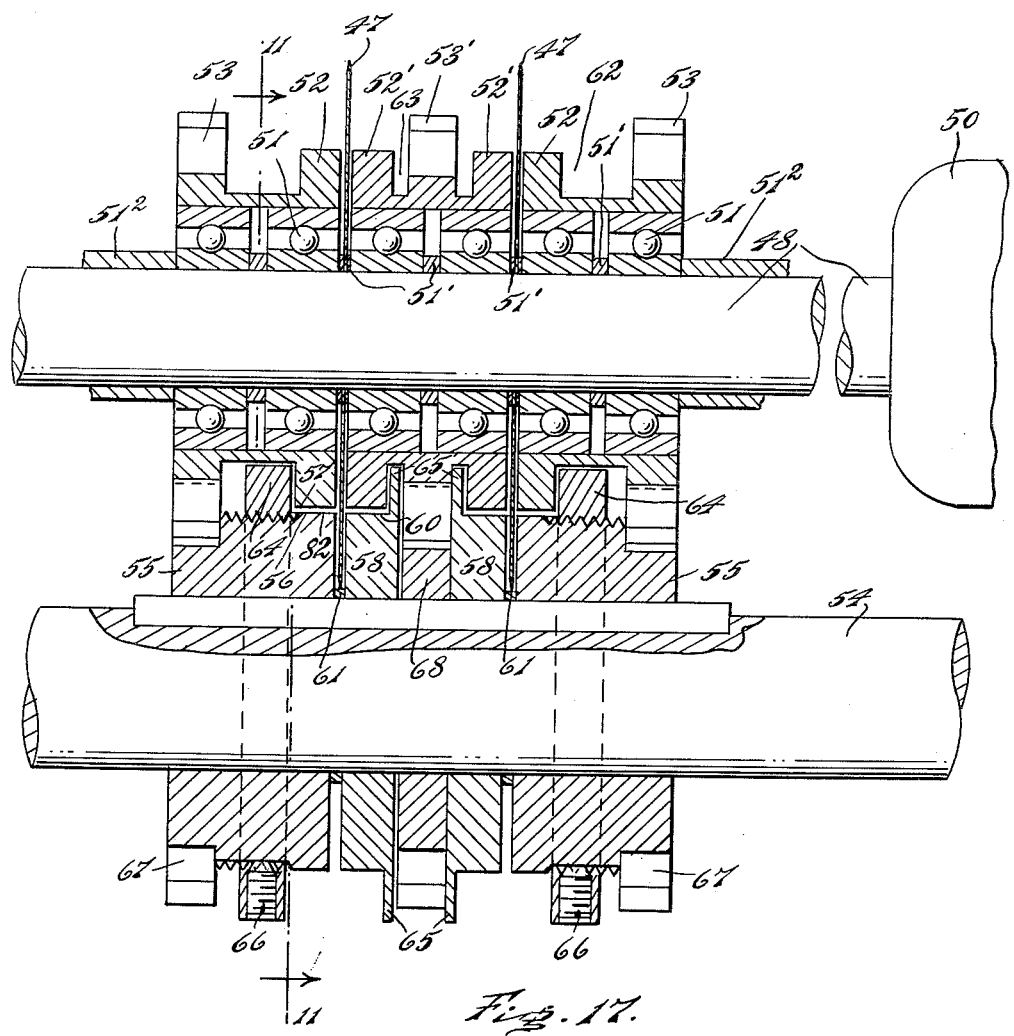
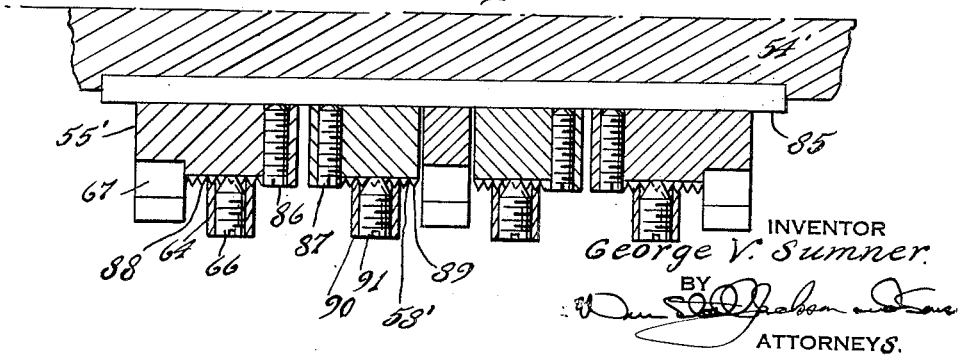
INVENTOR
George V. Sumner
BY
ATTORNEYS.

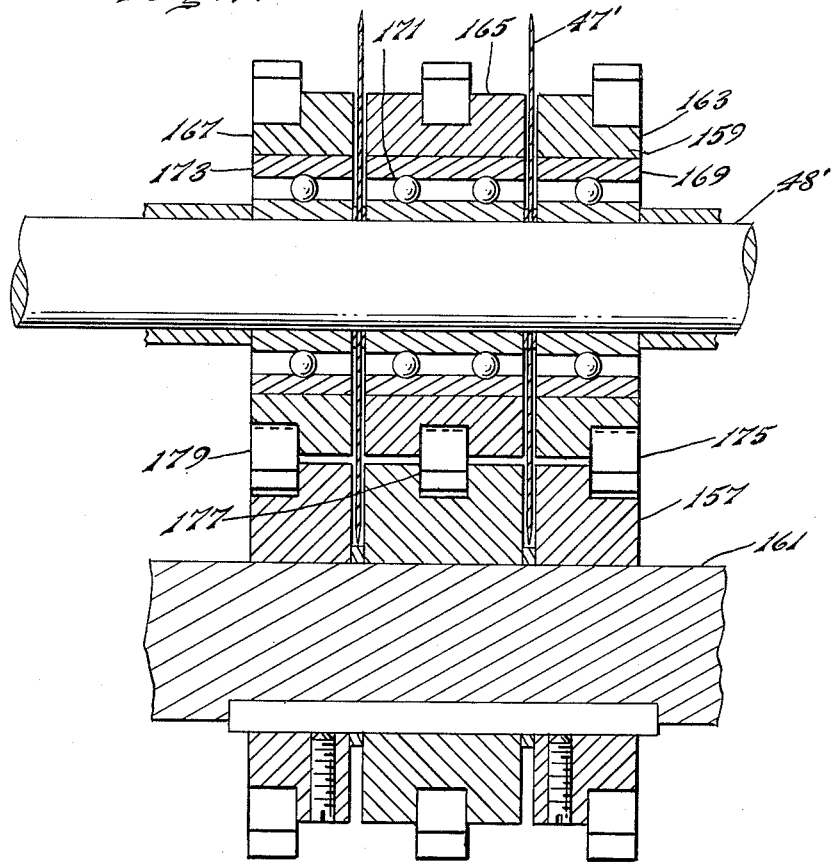

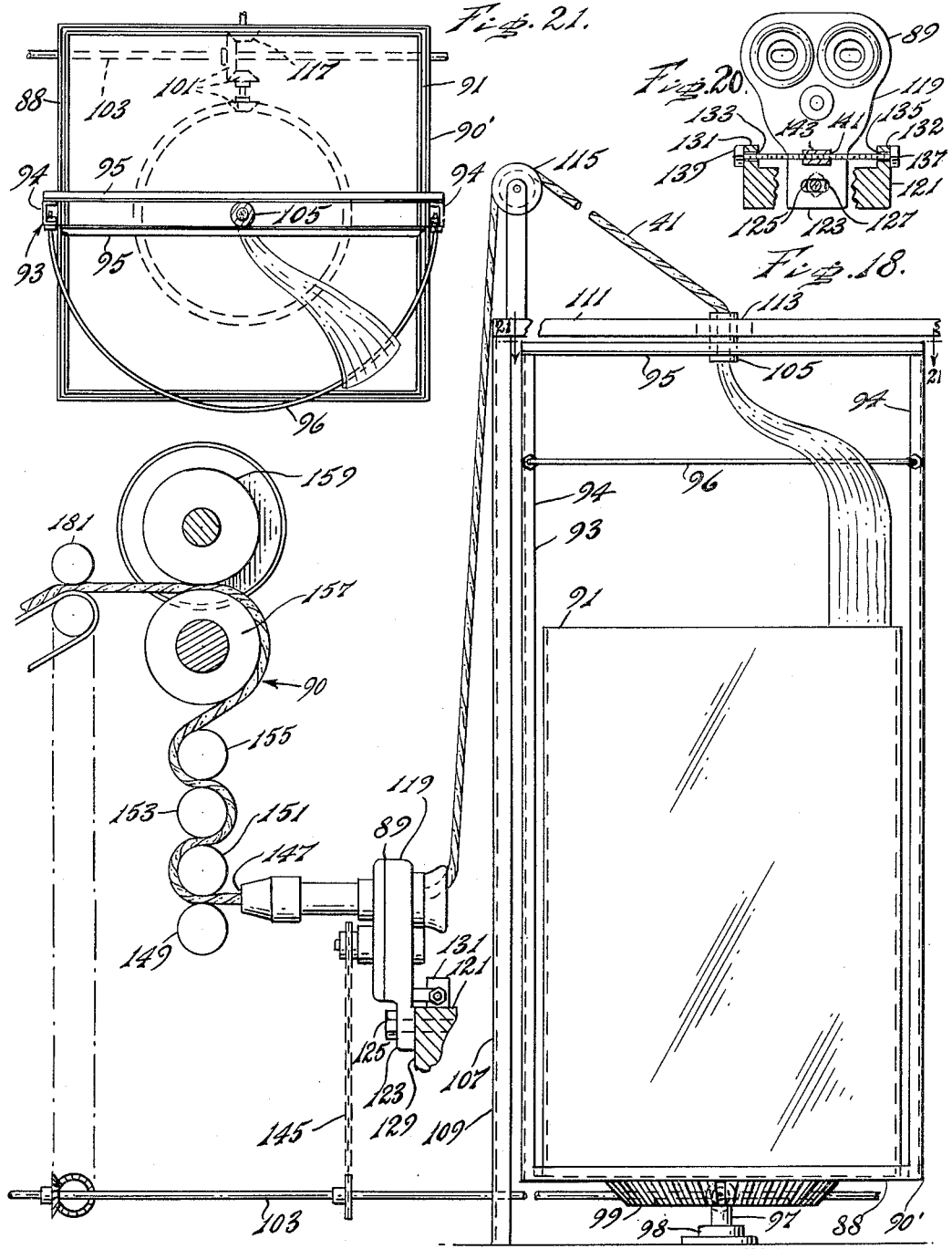

United States Patent Office 3,050,928
Patented Aug. 28, 1962

3,050,928
CONVERTING CONTINUOUS FILAMENT
TO STAPLE FIBER
George Vibert Sumner, Columbia, S.C., assignor to Sumner Company, Incorporated, Columbia, S.C., a corporation of South Carolina
Filed Aug. 18, 1959, Ser. No. 834,444
20 Claims. (Cl. 57—2)

The present invention relates to methods and machines for converting tow or the like into staple fiber.

The present application is a continuation-in-part of my copending application Serial No. 667,217, filed June 21, 1957, now abandoned, for Converting Continuous Filament.

A purpose of the invention is to simplify and facilitate the conversion of tow of synthetic continuous filament into staple fiber.

A further purpose is to obtain, by converting from continuous filament, variant lengths of staple fiber falling within a predetermined range of lengths which is practical for spinning.

A further purpose is to employ a relatively inexpensive and easily sharpened cutter for conversion, avoiding the necessity for complicated equipment.

A further purpose is to feed a twisted tow of continuous filament relatively forward and to cut the tow down the middle, dividing it into slivers on either side of the cutter, each of the slivers containing staple fiber within such predetermined range of lengths.

A further purpose is to grip the tow between rolls and to cut at the center of the tow.

A further purpose is to cut the tow suitably by a band saw or by a circular knife or other knife.

A further purpose is to vary the twist and thereby vary the length of the staple fiber.

A further purpose is to feed the slivers into drafting and condensing mechanism, so as to form a more level sliver, suitably also consolidating into the final sliver two or more slivers cut from the tow or from several tows.

A further purpose is to feed a tow by feed rolls closely adjacent the two sides of a rotary cutter.

A further purpose is to feed a tow by feed rolls that are flanged to prevent lateral displacement.

A further purpose is to adjust one of the flanges to assure close lateral association between that flange and the cooperating feed roll.

A further purpose is to journal one set of feed rolls on the cutter shaft and suitably drive them from the shaft on which the other set of feed rolls is mounted.

A further purpose is to improve the uniformity of distribution of different lengths among the staple fibers by untwisting and then immediately retwisting the twisted tow shortly before it is fed to the cutter, desirably holding the two in condition of equalized twist by feed rolls in between.

A further purpose is to twist the tow at a pre-determined lateral position and thereafter hold it in that lateral position for the cutter by use of feed rolls in between.

A further purpose is to take the tow in the condition in which it originally comes from the spinnerettes, and spread it and then bunch and twist it.

A further purpose is to convert continuous filament into variant-length staple fiber that is dull in color and has unusual loft and covering power.

A further purpose is to convert such filament into such fiber with a length variation over a length range of about two to one.

Further purposes appear in the specification and in the claims.

In the drawings I have chosen to illustrate certain forms only of the numerous embodiments in which my invention may appear, selecting the forms shown from the standpoints of convenience in illustration, satisfactory operation and clear demonstration of the principles involved.

FIGURE 1 is a front elevation of a converting machine according to the present invention, with the trumpet tubes shown in phantom.

FIGURE 2 is a side elevation of the machine of FIGURE 1, partly broken away.

FIGURE 3 is a top plan view of the machine of FIGURE 1.

FIGURE 4 is a fragmentary section of the machine of FIGURE 1 on the line 4—4.

FIGURE 5 is a fragmentary section on the line 5—5 of FIGURE 4.

FIGURE 6 is a view generally corresponding to FIGURE 4, showing a variation including a preferable form of cutter.

FIGURE 7 is an enlarged axial perspective showing the slivers in flattened form as gripped by the rolls immediately adjacent the point of cut just after cutting has taken place.

FIGURE 8 is a view similar to FIGURE 7 showing one of the slivers but illustrating a different average staple fiber length.

FIGURE 9 is a view similar to FIGURE 7 showing two of the slivers reoriented in position after cutting and suitable for subsequent operations involved in spinning.

FIGURE 10 is a diagrammatic top plan view showing the cutting of eight slivers and the consolidation on a pin drafter to form two consolidated slivers.

FIGURE 11 is an end elevation of an improved form of conversion cutter according to the invention, the view being partly in section on the line 11—11 of FIGURE 13.

FIGURE 12 is a section on the line 12—12 of FIGURE 11, omitting the slivers.

FIGURE 13 is a section on the line 13—13 of FIGURE 11.

FIGURE 14 is a rear elevation, partly broken away, of the rotating trumpet shown in FIGURE 11.

FIGURE 15 is a section on the line 15—15 of FIGURE 14.

FIGURE 16 is a top plan view of the device of FIGURES 14 and 15, sectioned on the line 16—16 of FIGURE 14.

FIGURE 17 is a fragmentary section corresponding to a part of FIGURE 13, but of an alternative preferred form, and shown with the key in the opposite direction in the rotation of the shaft.

FIGURE 18 is a partly fragmentary side elevation of a somewhat different form of the invention, which different form is the preferred form, the figure including among other things a showing of the turntable. It omits any showing of the gearing in the top two feed rolls, for clarity of illustration of the travel of the tow.

FIGURE 19 is a vertical section longitudinally along the axes of the shaft of the conversion cutter in the form of FIGURE 18.

FIGURE 20 is an elevation of the trumpet arrangement, including the trumpet mounting, in the form of FIGURE 18, taken looking in the general direction in which the tow is proceeding, with the mounting shown fragmentarily and partly in section.

FIGURE 21 is a horizontal section of FIGURE 18 along the line 21—21.

In the prior art, conversion of continuous filament into staple fiber has been made either by breaking fibers or by cutting the same. When conversion is accomplished by breaking, certain synthetic fibers are likely to suffer from elongation, tangling, and nub or slub formation. Conversion by cutting according to prior art methods has frequently involved the utilization of very expensive cutters especially designed for the purpose and difficult to sharpen. Also these mechanisms have been expensive to operate because of the high power consumption.

By the present invention it is possible to convert twisted tow into staple fiber by employing very simple and inexpensive cutting mechanism, which is easy to procure and which is readily sharpened.

In accordance with the invention an inexpensive type of band saw, circular knife or other knife may be used, preferably a uniform edged type which may readily be sharpened, a uniform edged rotating circular knife being decidedly the most desirable form.

The twisted tow is cut or ripped longitudinally down the center into portions or halves which form slivers having staple fiber of length within a predetermined practical range for spinning. These slivers will be spun separately, or consolidated, and they may be blended with another sliver suitably obtained from the same cutter.

By changing the twist on the tow, it is possible to vary the range of staple fiber lengths, that is, as will be explained, to change it for example from a range of say three to six inches to a range of say four to eight inches, since the average extent of the staple fiber between two cuts on the same fiber will depend upon the twist. Thus the converter, without stocking various raw materials, and without changing the cutter, can at will produce different average staple fiber lengths by simply changing the twist in the tow.

In accordance with the invention, the tow is preferably flattened or gripped at the point of cutting between rollers, the rollers being laterally displaced and the cutter operating in the zone between sets of rollers.

The invention is applicable to any one of the continuous filament synthetic fibers, which are produced in tow form, suitable examples being regenerated cellulose such as rayon, cellulose ethers like ethyl cellulose, cellulose esters like cellulose acetate, linear polyamide (nylon), acrylic, casein, and other suitable synthetic fibers.

The synthetic fiber may be obtained in any suitable multifilament tow, sometimes called a rope, or group of filaments.

If the tow is obtained untwisted, it will be given a twist, and if it is obtained twisted, the twist will be preserved or changed as desired by the operator, so that the twist of the fiber will on longitudinal cutting down the middle, give the correct range of fiber length.

It will be evident that the converter will adjust the twist in accordance with the requirements as to the particular range of fiber length of sliver.

A very desirable embodiment of the invention is a rotary conversion cutter having feed rolls immediately on either side and provided with flanges to restrain the tow laterally.

My preferred form, however, while utilizing a rotary conversion cutter with feed rolls on either side, does not have flanges to confine the two, but passes the tow through a trumpet in a predetermined position comparatively close to the cutter and then grips it by a pair of rotary feed rolls immediately adjacent the trumpet and leads it in continuous contact with those or other rotary feed rolls to the cutter.

The trumpet, which may also be employed in the form with the flanges, will serve to untwist and retwist the tow if it previously had been twisted. Such untwisting and retwisting is desirable even where the tow is nominally of the proper overall twist to begin with, because it is likely that the twist of the tow will have become uneven due to lack of uniformity in density.

Considering now the drawings in detail, a shaft 20 mounted on suitable bearings 21 supported by a frame 22 is driven as by pulley 23, belt 24 and pulley 25 from reduction gear box 26.

The shaft 20 has a plurality of spaced lower rollers 27 grouped in pairs, which in turn cooperate with upper rollers 28 on upper shaft 30 mounted on bearings 31 which are bolted loosely in vertical slots 32 and are capable of moving vertically so that the upper rollers can raise and lower under their weight or other suitable bias, depending upon the thickness of the tow. Gear 33 on lower shaft 20 drives gear 34 on upper shaft 30 and the gear teeth are sufficiently elongated so that the shafts can move toward and away from one another without influencing the drive.

A band saw 35, of a type which instead of teeth has a sharp uniform edge, or a sharp wavy edge without formal teeth as used in bread cutting, is mounted on pulleys 36 and 37 in well known manner, turning on suitable bearings. Pulley 37 is driven by belt and pulley combination 38 from the gear box 26. One band stretch 39 passes down between one set of upper and lower rollers to one side of the shafts and the other band stretch 40 passes up between the other set of rollers to one side of the shafts. Stretches of twisted tow 41 pass through the rollers, each centrally positioned with respect to the adjoining stretch of the band saw as by trumpet 41′ shown in phantom, so as to cut the tow into two equal slivers 42 on opposite sides of the band saw.

It will be evident that in the tow, the average length of the fibers 43 will be longer if the twist is more gradual as in FIGURE 8 and shorter when the twist is steeper as at 43′ in FIGURE 7.

It will also be evident that the slivers may be manipulated in any suitable manner, as by condensing, drafting and combining them in FIGURE 10, where four slivers 42 are drafted and condensed into one on each side of a suitable drafting mechanism, here a pin drafter 44, producing two outgoing slivers 45 and 45′ which are received by cans 46.

It will be evident that it is unimportant to the present invention whether the drafting and/or condensing are accomplished by a gill box, card, or drafting rolls, rather than a pin drafter as well known in the art.

In FIGURE 6 I show a device similar to that of other figures except that a circular knife 47 is used to cut down the middle of the sliver, instead of a band saw.

FIGURES 11, 12 and 13 illustrate a preferred embodiment of the invention. Rotary cutters, suitably circular knives 47, are keyed on a cutter shaft 48 which is journalled on suitable bearings not shown, and driven by a motor 50 at a speed which is desirably in the range between 700 and 800 r.p.m. for circular knives of 5½ inches diameter. While the drawing shows two circular knives to simultaneously convert two tows, it will be evident that one or more circular knives may be used on the cutter shaft. On opposite sides of the circular knives and closely adjacent them are placed the inner races of antifriction, suitably ball bearings 51 mounted on the shaft 48 and locked against shim spacers 51′ at intervals between the bearings by locking sleeves 51² held at the ends by suitable nuts, not shown, which thread on the shaft 48. A speed of about 800 r.p.m. is preferable.

The outer races of the antifriction bearings 51 are pressed in axial recesses of feed rolls 52 and 52′ which are placed relatively close on either side of the cutters 47, suitably within less than one-eighth of an inch, and preferably closer.

Each feed roll 52 is integral with a spur gear 53 and each pair of feed rolls 52′ is integral with spur gear 53′, the spur gears being all of the same diameter and the same number of teeth.

A second shaft 54 is placed parallel with the shaft 48, at a position just beyond the rim of the cutters 47. It has keyed thereon feed rolls 55 of desirably the same diameter as the feed rolls 52 and having their rims 56 brought close to the rims 57 of the feed rolls 52 so as to pinch and feed the tow. Cooperating with the feed rolls 52′ are feed rolls 58 also keyed on the shaft 54 and having their rims 60 of the same diameter as the rims 56 of the feed rolls 55.

The feed rolls 55 and 58 respectively are closely spaced on either side of the circular blade cutters, the spacing being determined by spacer rings 61 so that the ends of the feed rolls 55 and 58 are close to the sides of the circular knives, the clearance being not in excess of 0.010 inch in the preferred form and preferably not in excess of 0.005 inch so that the bottom feed rolls 55 and 58 can act as anvils for the cutters.

The feed rolls 52 are recessed at 62 on the side adjoining the spur gears 53 and the feed rolls 52′ are recessed at 63 on the side adjoining the spur gear 53′, and into this recess extends a flange 64 on each feed roll 55 or a flange 65 on each feed roll 58, as the case may be.

The flanges 65 in this form are integral with the feed rolls 58 but the flanges 64 are desirably adjustable along the feed rolls 55 to permit the proper close spacing. This can be done by mounting them on rolls 55 by means of interior threads cooperating with exterior threads on the portions of the rolls opposite the recesses on rolls 57, with set screws 66 being applied against convenient flats in the exterior screws to maintain their position.

Integral with the feed rolls 55 are spur gears 67 which desirably have the same number of teeth and the same diameter as the spur gears 53 with which they cooperate. Likewise between feed rolls 58 and keyed on shaft 54 there is a spur gear 68 having the same number of teeth and the same diameter as spur gear 67 and cooperating with spur gear 53′.

The shaft 54 is driven suitably by a gear-in head motor at a peripheral speed of the feed rolls which is preferably about 115 feet per minute. Thus the peripheral speed of the rotary cutter is desirably of the order of 8 to 10 times the peripheral speed of the feed rolls.

It is highly desirable in the case of the present invention that the tow be cut into substantially equal portions. To secure this, the exact position of the knife 47 relative to the flanges 64 and 65 may and indeed normally will be adjusted slightly from the precise geometric center, as by adjustment of the position of the flanges. For example, where the tow coming into the knife has a twist which, viewed from above in the direction of travel, goes to the left, with the top of the circular knife traveling toward the viewer, and the lower part of the knife doing the cutting, the flanges will normally be positioned so that the right hand flange is a very slight distance further away from the blade than is the left hand flange.

FIGURE 17 shows a preferred variation of the form of FIGURES 11–13 in which to facilitate such adjustment both the respective flanges are threaded on the shaft and set in position by set screws. More specifically, in this form feed rolls 55′ and 58′ are mounted on shaft 54′, by means of set screws 86 and 87 respectively, which bear on key 85. The feed rolls 55′ and 58′ are smooth (aside from the set screws) opposite the rims of the feed rolls corresponding to 52 and 52′ of the form of FIGURES 12–15, but further away from the cutters they have respective fine external threads 88 and 89 (e.g., 16 threads per inch), and on them the respective internally threaded flanges 64 and 90 are secured by means of set screws 66 and 91 respectively, which bear on flats in the exterior thread. There should be a number of flats at different circumferential positions around the exterior thread to give the desired adjustability. Gears 67 and 68 are provided as with the form of FIGURES 1 to 13, but the exact space between them is somewhat greater on account of the greater width of the roller 58′, and the cooperating members of the upper roller assembly (not shown) will have correspondingly greater spacing, the feed rolls in this form which correspond to feed rolls 52′ in the form of FIGURE 13 being broader as a result of having much broader recesses to extend opposite the entire width of flange 90 and the range of the flange's potential movement in the way the recess of feed roll 52 extends opposite the entire width of flange 64 and the range of its potential movement.

With my device properly adjusted to cut the tow into substantially equal parts, the different filaments will vary in length within a predetermined range, the shortest among the fibers being about half or somewhat more than half the length of the longest among them so that if a given maximum fiber length is desired and secured, the minimum can be held substantially to no less than half that maximum. This variation is on the same order as the variation involved in wool and is believed to involve a difference in length of a given fiber between points where cut dependent on whether the filament is on the outside or the inside of the tow. There is considerable opinion that such a limited variation in length is a positive advantage in the formation of staple fiber, as compared to an absolute uniformity of length.

The trumpet 41′, best seen in FIGURES 14, 15 and 16, is provided with two trumpet tubes 70, one for each sliver, having at the rear a converging conical entrance 70′; than a right cylindrical portion $70^2$ and then a generally rectangular narrow mouth $70^3$ which flattens the sliver. The interior of the mouth tapers at $70^4$.

Each tube is journalled at $70^5$ in a housing $70^6$.

Each tube carries on its outside a pinion 71 which meshes with a driving gear 71′ on a shaft $71^2$ journalled in the housing.

The trumpet causes the tow to first untwist and then retwist, but in doing so evens up the twist and reduces or eliminates the tendency of the tow, because of unevenness in density, to concentrate twist in some areas and reduce twist in other areas. If the twist of the tow initially is clockwise when looking in the direction toward which the tow is feeding, the trumpet, when viewed from the inlet end, is turned clockwise.

The amount of the twist for any given tow depends on the speed of rotation of the trumpet in relation to the speed at which the tow is fed through it. For example, to get a maximum fiber length of six inches, which would mean a fiber length varying throughout the range of from about three inches to a maximum of six, the trumpet feed would initially be set to give about two turns of the trumpet per foot of tow fed through, and then a little adjustment of the setting would be made to give the precise result as desired, as determined by the actual exact range of length of fibers coming through in the particular case.

After each strand of tow has been retwisted by its trumpet, it passes back and forth between feed rolls 73, 74 and 75 which retain the even twist, and then is guided over lease rods 76 and 77 and then around the rim of an antifriction bearing feed roll 78, which is placed on a fixed shaft 80 between stationary feed plates 81, the rim of the feed rolls 78 extending between flanges 64 and 65 of the cutter feed rolls 55 and 58 to bring the tow into the space 82 where its is flattened and where it encounters the rotary cutter along the middle.

Feed rolls 73, 74 and 75 should be driven at such a speed that the tow, when it is running between roll 75 and its passage between rolls 55 and 52, and more particularly when it is at the point it is cut, is not under tension but just a little loose, although not loose enough to depart from the particular positioning which it is intended to assume. This can be done, for example, by driving the rollers 73, 74 and 75 by means of an independent change speed gear (not shown) of small pitch, to give a high degree of adjustability of driving speed, and by making suitable adjustment of speed thereby.

In operation of the device of FIGURES 11, 12 and 13, the tow is desirably first twisted, then untwisted and retwisted by the trumpet, and then fed by the feed rolls, the lease rods and the roller feed to the rotary cutter where the upper and lower feed rolls moving at the same speed flatten the tow, restraining it laterally and keeping it central, and the cutter cuts the tow along the middle to form two slivers of staple fiber.

From the cutter the slivers pass to suitable drawing and spinning mechanism.

The form of my invention, which I prefer above any of the others here shown, and which I believe to be, everything considered, the most desirable of which I am aware, is that shown in FIGURES 18–21.

It includes turntable setup 88, trumpet arrangement 89, and multiple feed roll and cutter arrangement 90.

Turntable setup 88, shown in FIGURES 18 and 21, includes turntable 90', which supports separate box 91. Frame 93, mounted on the turntable and rigid with it, consists of two vertical channels 94, extending up from it, one on either side of the box, and crosspiece 95 running across at the top between them. Near the top, semicircular bar 96 extends in a horizontal plane from one vertical arm to the other.

The turntable is mounted on vertical shaft 97, which is rotatably supported by thrust bearing 98. Large bevel gear 99 is fixed on the underside of the turntable, in a position surrounding the vertical shaft, and is driven by suitable gearing 101 from horizontal shaft 103, from which the moving parts in trumpet arrangement 89 and in the gill box are also driven.

At the midpoint of crosspiece 95, which consists of two parallel bars is mounted vertical throat 105, a vertical tube between the bars, and extending up substantially beyond the crosspiece. Support frame 107, with vertical portions 109 (only one of which is shown) and horizontal crosspiece 111 stretching across between them at a level a little above the top of the turntable frame 93, holds throat 105 in bearing 113 (represented by dotted lines in FIGURE 18 because concealed by the crosspiece), thus maintaining the turntable, turntable frame and box in upright position.

As will be understood, vertical portion 109, of supporting frame 107, actually has sufficient clearance from the rectangular turntable in the turntable's square-on position to permit rotation of the turntable, although, owing to the fact that the crosspiece 111 of the supporting frame is shown broken away, this clearance is not shown in the drawing.

Mounted on supporting frame 107 in a position above the crosspiece 111 and on the edge toward trumpet arrangement 89, is V-pulley or spool 115, with its axis of rotation parallel to the edge.

The turntable here shown would usually be only one of two or more such turntables with similar associated structure. Thus, the example shown in the drawing shows part of the gearing 117 to drive a similar turntable setup next to the one shown, which would supply the second cutter in the multiple feed roll and cutter arrangement 90 through the second trumpet tube in trumpet arrangement 89, and shaft 103 is shown as going on beyond to drive another pair or pairs of turntables to feed other cutter arrangements not shown.

Trumpet arrangement 89, shown in FIGURES 18 and 20, has trumpet 119 which in the example shown is substantially identical to trumpet 41 which is shown in greater detail in FIGURES 14–16, except that it is mounted differently and its moving parts are driven somewhat differently.

Support member 121 for trumpet 119 holds trumpet shank 123 by means of bolt 125 passing through horizontal slot 127 into a suitable screw hole in vertical face 129 of the support member. Support member 121 also has two spaced upwardly projecting lugs 131 and 132 in its top, with holes 133 and 135, respectively, in them along the same axis. The threads of long bolt 137, which is held in these holes by nut 139, are threaded into screw-threaded hole 141 in projection 143 from the trumpet. Thus the lateral position of the trumpet as a whole can be fixed by the position of projection 143 on long bolt 137, with the relative position of bolt 125 and slot 127 being correspondingly altered.

The moving parts of trumpet 119 are driven by chain 145 from shaft 103. Trumpet 119 is located between V-pulley or spool 115 and multiple feed roll and cutter arrangement 90, and more specifically with mouth end 147 of the trumpet located immediately adjacent the space between lowermost feed rolls, 149 and 151, respectively, of the multiple feed roll and cutter arrangement.

Multiple feed roll and cutter arrangement 90 includes a series of feed rolls mounted one above the other, which, going from bottom to top are respectively 149, 151, 153, 155, 157 and 159. These are spaced so as to grip the tow between each two successive feed rolls except between 155 and 157, where a slightly greater spacing is employed, to permit clearance for the gearing.

In this form of FIGURE 19 the various features of the two top feed rolls 157 and 159 and the circular knives 47' associated therewith, are substantially the same as with that shown in the form of FIGURE 13, except that the flanges are omitted and the setup correspondingly contracted.

Specifically, rotary circular knives 47' are on cutter shaft 48'. Feed roll 157, made up of three separate individual rolls on shaft 161, drives feed roll 159, which is collectively composed of individual rolls 163, 165 and 167, mounted respectively by means of ball bearings 169, 171 and 173 (schematically shown) on shaft 48', but turning independently of the shaft. The driving of feed rolls 163, 165 and 167 is accomplished by respective intermeshing pairs of gears 175, 177 and 179.

The roll setups can be held on their respective shaft in any suitable manner, as for example in the manner shown in FIGURE 13, as shown with bearings for roll 159, or in the manner shown in FIGURE 17, as shown with roll 157.

In the preferred form shown in FIGURES 18–21, synthetic multifilament flat ribbon in the form in which it originally comes from the spinnerettes is brought in in the box 91 and the box placed on the turntable 90 with its top off. The ribbon is led up over the outside of the semicircular bar 96 on up through throat 105, with the turntable turning at a proper rate of speed to give it an initial twist averaging that ultimately desired. The gathered twisted tow which emerges from the throat passes across V-pulley or spool 115 and down through one of the trumpet tubes or trumpet setup 89, which is turning at a rate to untwist and correspondingly retwist the tow, with non-uniformities of twist removed. From the other end 147 of the trumpet tube it passes immediately through between rolls 149 and 151 which grip it, then up around one side of roll 151 to a corresponding gripping point between it and roll 153. It then passes around the other side of roll 153, through a gripping point between it and roll 155, around a side of roll 155 and then around the other side of roll 157 to a gripping point between it and roll 159, being cut by the circular knife just a little before it reaches this last gripping point. It then goes to the next device such as the first rolls 181 of a gill box.

Unlike the situation in the form of FIGURES 11–17, in the preferred form of FIGURES 18–21 the tow, in its progression from the first feed roll to the cutter and feed rolls associated with the cutter, should not be kept a little loose, but firm instead.

However, as has already been indicated previously in connection with the flanged form, also in this preferred form of FIGURES 18–21, in order to give a cut which actually divides the tow into two equal portions, and therefore presumably actually passes approximately through the midpoint of the tow in the actual cutting, the tow will normally have to be fed into the knife in a position such that the knife, as viewed from above, appears slightly to one side of the center of the tow as it first meets the knife edge. Which side of the center it is, depends on the direction of twist of the tow. If the tow has a twist which, viewed from above in the direction of travel goes over to the left, which is known as an S twist, the knife should be slightly to the left of center as it meets the tow.

If it is found that the knife is not cutting the tow in two precisely equal parts, the long bolt 137 or other suitable micrometer adjustment can be used (along with loosening and then tightening bolt 125) to slightly shift the position of the trumpets laterally. This will shift the position of the tow as it reaches the knife to give the proper division of the tow.

If a different twist of the fiber being cut is desired in order to have a different average length of staple fiber, this can readily be secured by suitable change of gears to produce a different rate of turning of the turntable and trumpet tubes relative to the rate of feed of the tow.

Not only is my invention an unusually convenient and inexpensive way to convert synthetic continuous filament into staple fiber, but the resultant staple fiber, as already mentioned, has a desirable variation in length over a 2–1 range, and has unusual loft or covering power and a desirable dullness, as compared with staple fiber converted by conventional methods.

Where the claims refer to the knife being central relative to the tow or cutting through the middle of the tow, or words to like effect, it is meant that the knife is located with its cutting edge passing through the approximate midpoint of the tow and thus dividing it into two equal parts, and is so defined. It does not mean that it necessarily first meets the top of the tow at the exact midpoint thereof.

In view of my invention and disclosure, variations and modifications to meet individual whim or particular need will doubtless become evident to others skilled in the art, to obtain all or part of the benefits of my invention without copying the methods and apparatus shown, and I, therefore, claim all such insofar as they fall within the reasonable spirit and scope of my claims.

Having thus described my invention, what I claim as new and desire to secure by Letters Patent is:

1. The method of converting a tow of continuous artificial filament into staple fiber, which comprises twisting the tow of continuous filament and cutting said tow continuously longitudinally down the center, and by said cutting completely severing said tow into two slivers.

2. The method of claim 1, which comprises flattening the tow and gripping it before cutting.

3. The method of claim 1, which comprises untwisting and then twisting the twisted tow shortly before cutting to equalize the distribution of the twist.

4. The method of claim 3, which comprises gripping the retwisted tow by a feed means immediately after retwisting and feeding it to the cutter to retain the equalization of the twist.

5. The method of converting a twisted tow of continuous artificial filament into staple fiber, which comprises cutting the twisted tow of continuous filament longitudinally straight down the center and thereby completely severing the tow into two slivers.

6. The method of forming staple fiber of predetermined range of length from artificial tow of continuous filament, which comprises twisting the tow of continuous filament to produce a twist which will give the approximate predetermined fiber length when cut, and cutting the twisted tow down the center to form two slivers.

7. A conversion cutter for forming staple fiber from tow of continuous artificial filament, which comprises means for progressing the tow forward, a knife located straight along the center line of the tow, means for operating the knife to cut the tow completely through at the center into two slivers, and means for consolidating and drafting the slivers which are obtained by severing the tow longitudinally at the center.

8. A conversion cutter for textile fibers, comprising a first shaft, a straight continuous rotary cutter on the first shaft adapted to turn with it, first feed rolls surrounding and journaling on the first shaft, one on either side of the rotary cutter, a second shaft generally parallel with the first shaft, second feed rolls mounted on and turning with the second shaft, one located on each side of the rotary cutter, the first and second feed rolls having rims which cooperate in adjacent relation to feed a tow through the cutter, means for interrelating the speed of rotation of the first and second feed rolls, means for driving the rotary cutter at a relatively higher linear speed, and means for driving the feed rolls at a relatively lower linear speed.

9. A device of claim 8, in which the first and second feed rolls are of the same diameter from the axis to their textile feeding surfaces.

10. A conversion cutter for forming staple fiber from twisted tow of continuous artificial filament comprising means for untwisting and then retwisting the tow, means for progressing the tow forward, a knife located on the center line of the tow, and means for operating the knife to cut the tow at the center into two slivers.

11. A conversion cutter for forming staple fiber from tow of continuous artificial filament, which comprises means for twisting and then immediately untwisting the tow, means including feed rolls receiving the retwisted tow and carrying it forward, a knife located along the center line of the tow coming from the feed rolls, and means for operating the knife to cut the tow at the center into two slivers.

12. A conversion cutter for forging staple fiber from twisted tow of continuous artificial filament, which comprises means for untwisting and then immediately retwisting the tow, feed rolls receiving the retwisted tow and progressing it forward, lease rods supporting and guiding the tow from the feed rolls, roller guide means guiding the tow from the lease rods, and cutter means receiving the tow from the roller guide means and severing the tow longitudinally of the tow.

13. A device for cutting continuous filament into individual lengths comprising means for receiving continuous filament in the form of a multifilament strand, imparting a uniform predetermined twist to the strand, and progressing the twisted strand along a predetermined path, and means located along the predetermined path for cutting the twisted strand in the longitudinal direction of the strand.

14. A device for converting continuous filament into staple fiber comprising a first means for receiving a sliver made up of a group of continuous filaments and imparting a uniform twist in said sliver, a second means for at least temporarily gripping said sliver immediately after it leaves said first means and then leading it under substantially continuous frictional contact along a predetermined path, and means for slitting the sliver longitudinally down the middle into two equal parts while still under such contact.

15. A device for severing continuous filament with a view to producing staple fiber, comprising means for receiving a strand of continuous fiber and giving it a predetermined uniform twist, a series of rolls each adjacent to at least one other of the series and providing a serpentine path for such fiber from a point near the means for receiving the fiber and giving it a twist, which path includes a gripping area between two of the rolls at a point removed from the said means, and means for cutting the fiber longitudinally at a point along its length where the fiber is in contact with at least one of the said two rolls.

16. A device for converting continuous filament to staple fiber comprising means for holding and rotating a holder for continuous filament in the form of ribbon made up of parallel filaments, a first member above the holder having a convex friction surface, a throat member above the first member which throat member is stationary in position, a trumpet having an outlet slit, means for gripping a strand of continuous filament shortly after it leaves the slit, progressing it in substantially continuous friction contact, and then again gripping it, and means for cutting it longitudinally near where it is again gripped.

17. A device for converting continuous filament into staple fiber comprising a trumpet having rotatable walls forming a rotatable slit in one end of the trumpet, at least four rolls mounted one adjacently above the other in a single tier, the lowermost two of which are positioned to grip a strand made up of continuous filaments immediately after it comes out of the slit, and the uppermost two of which are positioned to again grip such a strand, and a moving knife edge positioned and traveling in a plane longitudinal of the strand in the vicinity of the uppermost two rolls.

18. A device for converting continuous filament into staple fiber comprising a trumpet having rotatable walls forming a slot and having an axis of rotation extending in a predetermined direction, a series of rotatable rolls each adjacent to the preceding one in the series, with axes of rotation parallel to one another and perpendicular to the axis of rotation of the walls forming a slot, two adjacent ones of said rolls being positioned to grip a strand made up of continuous filaments immediately after the strand comes from the slot and two adjacent ones of the rolls being positioned to grip the strand at a later point on its travel, means to cut the strand longitudinally at a point on its travel where it is in the vicinity of at least one of the two rolls most recently mentioned, and means to adjust the position of the walls forming a slot relative to the position of the rolls in a direction parallel to the axes of rotation of the rolls.

19. The method of making synthetic staple tow for spinning into yarn, comprising taking fiber in a broad as-spun band of parallel continuous filaments, spreading and then gathering it into a ribbon and imparting a predetermined twist thereto, untwisting and returning the same an average amount, substantially continuously gripping it after the final twist, cutting it longitudinally in two equal slivers, and blending the slivers.

20. A conversion cutter for textile fibers comprising a first shaft, a rotary cutter on the first shaft adapted to turn with it, first feed rolls surrounding and journalled on the first shaft, one on either side of the rotary cutter, a second shaft generally parallel with the first shaft, second feed rolls mounted on and turning with the second shaft, one located on each side of the rotary cutter, the first and second feed rolls having rims which cooperate in adjacent relation to feed a tow through the cutter, means for interrelating the speed of rotation of the first and second feed rolls, and flanges on one of the first and second feed rolls extending adjacent to the sides of the other of the first and second feed rolls and confining the tow laterally, at least one of the flanges being axially adjustable with respect to the cooperating feed roll.

References Cited in the file of this patent

UNITED STATES PATENTS

| | | |
|---|---|---|
| 1,439,805 | Ehlig | Dec. 26, 1922 |
| 2,109,176 | Knight | Feb. 22, 1938 |
| 2,180,172 | Schmitt | Nov. 14, 1939 |
| 2,234,105 | Ashton | Mar. 4, 1941 |
| 2,247,529 | Taylor et al. | July 1, 1941 |
| 2,249,664 | Morton et al. | July 15, 1941 |
| 2,363,470 | Lannan et al. | Nov. 21, 1944 |
| 2,427,955 | Furness | Sept. 23, 1947 |
| 2,598,086 | Von Kohorn | May 27, 1952 |
| 2,736,162 | Steinberger | Feb. 28, 1956 |

FOREIGN PATENTS

| | | |
|---|---|---|
| 854,829 | Germany | Nov. 6, 1952 |
| 515,672 | Great Britain | Mar. 2, 1938 |